Patented Dec. 12, 1950

2,533,808

UNITED STATES PATENT OFFICE 2,533,808

MANUFACTURE OF ISOPROPYL ALCOHOL FROM PROPYLENE

John Howlett, Tonbridge, and William Laurence Wood, Hull, England, assignors to The Distillers Company Limited, Edinburgh, Scotland, a British company No Drawing. Application March 26, 1948, Serial No. 17,368. In Great Britain April 3, 1947

6 Claims. (Cl. 260—639)

This invention relates to improvements in the known process for the manufacture of isopropyl alcohol wherein propylene is absorbed by sulphuric acid and the sulphuric ester formed thereby is hydrolysed with the generation of isopropyl alcohol.

A great number of publications deal with the problem of effecting this conversion in an economical manner. Thus, for instance, it has been suggested in British Patent No. 428,792 to absorb the propylene in sulphuric acid of a concentration between 85% and 90% and to hydrolyse the isopropyl sulphate after dilution of the solution with an amount of water between its own weight and half this amount. This corresponds to concentrations of sulphuric acid varying from 45% to 60%.

In British Patent No. 499,398 it has been proposed to use sulphuric acid of a concentration from 1% to 84% for the absorption of the propylene, the preferred concentration being about 50 to 70%. The absorption is effected at temperatures of 30° C. or higher and at partial propylene pressures of from 2 to 200 pounds per square inch. The reaction mixture containing the propylene as isopropyl sulphate in admixture with some ether is then subjected to a heat treatment at between 60° and 130° C., without addition of water whereby the isopropyl alcohol is distilled off.

In prior British Patent No. 448,457 there is described a process for the conversion of propylene into its sulphuric ester and the production therefrom of isopropyl alcohol which comprises absorbing propylene under 250 to 350 lbs./sq. inch pressure at 20° to 25° C. in sulphuric acid of 93% strength and hydrolysing the resulting mixture after addition of water. The absorption is effected in a coil made of steel tubing.

According to British Patent No. 484,437, the absorption of propylene is carried out in sulphuric acid of 70% to about 85% concentration at a preferred temperature range of from 45° to 60° C., maintaining the resulting mixture at an acid concentration of 50% to 90% in a closed system under pressures greater than the partial pressure of the absorbed propylene content in the hydrolysing system during hydrolysis. In some cases the absorption mixture may be diluted with water before it is heated in the closed system.

In prior U. S. Patent No. 1,991,948 there is described a process for reacting olefines, such as propylene or butylene, in the gaseous phase with sulphuric acid, the strength of which may vary from 60% to 87%, at temperatures from 35° to 65° C. with a preferred range of 45° to 55° C. The pressure at which the contact is effected may be from atmospheric to slightly below that at which condensation of gas to liquid occurs at the temperatures used. The reaction results in the formation of considerable amounts of polymers which separate from the alkyl sulphate-sulphuric acid mixture by gravity in a layer and are separated therefrom. Monohydric alcohols may be produced from the liquid reaction mixture by dilution with 2 to 10 times its volume of water and subsequent distillation. The acid concentrations referred to in the above indefinite fashion amount to 8 to 25.5% diluted from an initial acid strength of 60%, and 13 to 39% from an acid of 87%.

The results obtained by working on the previously proposed lines, however, do not satisfy all the industrial requirements, when the processes are carried out on a large scale.

The present invention is based partly on the discovery that when the absorption of the propylene in sulphuric acid is effected in ordinary mild steel equipment, at temperatures from about 40° to 80° C., the steel is heavily corroded if the acid is of a strength of less than 65% and greater than 80% by weight and, furthermore, that considerable decomposition of the acid occurs if the hydrolysis is carried out at acid concentrations in excess of about 47%.

It is an object of this invention to use as low a concentration of sulphuric acid as possible for the absorption of the propylene and as high a concentration as possible for the hydrolysing stage in order to facilitate the subsequent concentration and thereby re-use of the acid employed. It is another object to work at concentrations which will allow the use of mild steel in preference to more expensive steel alloys for the construction of the equipment. Finally it is a further object to carry through the process of absorption and hydration with the least losses in valuable material and with as high a yield of isopropyl alcohol as possible.

Accordingly, the novel process of producing isopropyl alcohol comprises absorbing propylene in the liquid phase at temperatures between 55° and 70° C. in sulphuric acid of a strength between about 65% and 80% by weight and then diluting and heating the resulting reaction mixture in such a manner that the isopropyl alcohol and di-isopropyl ether formed are distilled off and the stripped sulphuric acid has a strength of not more than 47% by weight, preferably not more than 45% by weight. If desired, the distilled isopropyl alcohol and di-isopropyl ether may be separated by fractionation.

The preferred acid concentration for the absorption is between 72 and 75% because this concentration not only ensures the least corrosion of any mild steel which may be in the employed equipment but also allows the absorption to be carried out with a concurrent low production of di-isopropyl ether as well as a minimum of polymers, and we have further discovered that the use of acid of a concentration within the preferred range of between 72 and 75% w/w has the advantage that at the operating temperature of 55° to 70° C. it will absorb and convert almost completely into isopropyl sulphate the di-isopropyl ether recovered as a by-product on hydrolysis of the mixture resulting from the absorption of propylene. Sulphuric acid of a concentration of less than 65%, on the other hand, does not absorb the ether readily under the prevailing conditions, and its use would entail a tendency towards unequal distribution in the acid and thereby prevent or impair complete conversion.

The separately recovered di-isopropyl ether may be introduced with advantage into the absorbing acid either concurrently with the propylene or beforehand. Advantageously, the molecular ratio of the acid to ether is adjusted to a proportion of from 10 to 20 of acid to 1 of ether. In this way the conversion of the ether into alcohol is achieved to an extent of from 93 to 99% and even more, and at the same time the absorption of the propylene by the acid is not appreciably influenced by the presence of the di-isopropyl ether.

The absorption of the propylene in the acid according to the invention is carried out under increased pressures which should be sufficient to keep the propylene in the liquid phase but may otherwise vary within wide limits. Pressures of from 300 to 450 lbs./sq. inch have been found favourable for a rapid and extensive absorption of the propylene in the acid and its conversion thereby into isopropyl ester.

Good contact between the propylene or the mixture containing it and the absorbing acid is essential. This may be achieved, for instance, by efficient agitation or by the use of absorption towers, preferably in countercurrent. The absorption may be continued, if desired, until the concentration of propylene in the effluent has been reduced to below 5% by weight, and it will therefore be understood that propylene of any concentration higher than 5% may be treated. The extent of absorption in a countercurrent system such as a series of agitator vessels and intermediate separators will depend not only on the relative amount of acid employed but also on the length (number of stages) and capacity of the system and on the rate of throughput. Mixtures of relatively low propylene content will require a greater number of stages under otherwise similar conditions to obtain a given degree of extraction. A molar proportion of 1.6 to 1, propylene to acid, with a liquid mixture containing 40% propylene has given satisfactory absorption within an economical time, whilst with about 90% propylene and more it has been found possible to increase the molar proportion to 1.9 and even 2.0 to 1 without impairing the efficiency of the absorption.

The reaction mixture resulting from the absorption is diluted according to the invention to give an acid concentration not exceeding 47% by weight after the ester has been hydrolysed and the alcohol driven off. The upper limit of acid strength for hydrolysis is critical in view of the increasing losses known to result from acid strengths above 47% by weight. Below this figure the losses during hydrolysis are minimized. Thus, it has been ascertained that, with an acid concentration of 42% (leaving the hydrolysing zone) the decomposition of the isopropyl alcohol amounts to 2.4% and that of the acid to 0.1%, resulting from its reduction to sulphur dioxide; these decompositions rise rapidly with increasing acid concentration so that with 47.2% w/w sulphuric acid the decomposition of alcohol is 8.7% and of the acid 0.9%, and with a sulphuric acid concentration of 51.5% the decomposition is 24.7% of alcohol and 3.5% of acid.

The greater the dilution of the acid during hydrolysis, the less will be the tendency to form di-isopropyl-ether as a byproduct, but the greater will be the operating costs of the concentration of the acid for reuse, and a lower limit for effluent acid strength from the point of view of economy is 40% by weight. If desired, the acid leaving the hydrolysing zone may be fed direct to a reconcentration zone, which may be of conventional design, thereby conserving its heat content.

The hydrolysis of the isopropyl ester and stripping of the resulting alcohol may be effected simultaneously by means of, for example, live steam preferably fed in countercurrent to the flow of the reaction liquid to be hydrolysed. Distillation columns may serve for the hydrolysis and the simultaneous stripping of the isopropyl alcohol and isopropyl ether formed. By the use of deep plates provided with bubble caps or similar contrivances in the columns provision is made for a certain residence time of the reaction mixture, and the size of the columns is reduced. The reaction mixture coming from the absorption stage is introduced into the hydrolysing zone, preferably in conjunction with some water, and the amount of water added, the heating of the mixture and the rate of flow of the reaction mixture and of stripping steam are adjusted in such a manner that the mixture is stripped of the isopropyl alcohol and isopropyl ether substantially completely on the first section, and that the acid leaves the zone at a strength not exceeding about 47%, preferably at between 40 and 45%. The acid is subsequently concentrated and reintroduced into the absorption system as absorbing acid.

The isopropyl alcohol is recovered after separation from the di-isopropyl ether by fractionation and the latter may be reintroduced into the absorption system in the manner described above if desired.

The following examples serve to illustrate the process of the invention:

*Example 1*

A liquid hydrocarbon mixture containing 90% by weight of propylene, the remainder being essentially propane, was brought into contact with 75% by weight sulphuric acid in a countercurrent system for 1 hour under 350 lbs./sq. inch pressure at 60° C. This resulted in a product containing 1.57 mols of propylene to 1 mol of acid, and in 99.5% removal of the olefine.

This reaction mixture was introduced into a hydrolysing column into which live steam was introduced at the bottom. The rate of flow and the amount of steam introduced were adjusted so that the acid leaving at the bottom had a strength of 41.6% and the products recovered from the hydrolysis, calculated on the propylene entering the absorption stage, were:

| | Percent w/w |
|---|---|
| Isopropyl alcohol | 89.5 |
| Di-isopropyl ether | 7.3 |
| Polymeric bodies | 0.3 |

In addition 2.4% of the alcohol was decomposed and left the system as propylene calculated on the propylene equivalent of the ester fed into the system.

In contrast to the above described hydrolysing step a similar reaction product from the absorption stage containing the same molar proportion of propylene to acid was subjected to hydrolysis, but the concentration of the stripped acid leaving the hydrolyser was kept at 51.5% strength. The various products recovered were as follows:

| | Per cent |
|---|---|
| Isopropyl alcohol | 66.2 |
| Di-isopropyl ether | 8.2 |
| Polymer | 0.6 | whilst 25% of the alcohol reverted to olefine.

*Example 2*

A liquid propylene-propane mixture containing 40.7% of propylene was brought in a countercurrent system into contact with 75% by weight sulphuric acid maintained at 60° C. After a contact time of 4 hours there resulted a product containing 1.63 mols of propylene to one of acid. The residual gas contained 3.2% propylene, thus giving a percentage removal of 95.2% of the olefine initially present in the feed.

The resulting reaction mixture was then hydrolysed as described in Example 1, adjusting the admission into the hydrolyser and the dilution by means of water and steam so that the sulphuric acid at the bottom of the hydrolyser had a strength of 42% by weight. The isopropyl alcohol was separated from the di-isopropyl ether by fractionation of the vapour mixture leaving the hydrolyser column, and the di-isopropyl ether was then introduced into the 75% sulphuric acid admitted into the propylene absorption stage at 60° C. in a molar ratio of ether to acid of 1:20. The ester produced thereby had a molar ratio equivalent to 0.1 to 10, propylene to acid. This mixture was passed under 350 lbs./sq. inch pressure in countercurrent to a liquid hydrocarbon mixture containing 92.6% propylene, the remainder consisting essentially of propane, and 99.5% of the propylene was absorbed in 2 hours to result in a product containing 1.84 mols of propylene to 1 of acid.

*Example 3*

A liquid propylene-propane mixture containing 42.3% by volume of propylene was stirred at 70° C. with an equimolecular proportion of sulphuric acid, based on the propylene, the acid being of 75% concentration by weight. After a period of 60 minutes it was found that 78% of the propylene had been absorbed. The acid layer was then hydrolysed as described in Example 1, to give a good yield of isopropyl alcohol.

We claim:

1. In a process for producing isopropyl alcohol, which comprises absorbing propylene in the liquid phase at a temperature in the range 55–70° C. in sulphuric acid of a concentration in the range 65% to 80% by weight, diluting the resulting mixture with water, and heating the diluted mixture in a hydrolysing zone to remove formed isopropyl alcohol and di-isopropyl ether in the vapour phase, the quantity of added water being such as to leave sulphuric acid of a concentration in the range 40% to 47% by weight in the liquid phase, the steps of separating the removed isopropyl alcohol and di-isopropyl ether from each other, and recycling and absorbing the di-isopropyl ether in the sulphuric acid having a concentration in the range 65% to 80% by weight, whereby the di-isopropyl ether is converted into isopropyl sulphate which, upon hydrolysis, increases the yield of isopropyl alcohol.

2. In a process for producing isopropyl alcohol, which comprises absorbing propylene in the liquid phase at a temperature in the range 55–70° C. in sulphuric acid of a concentration in the range 65% to 80% by weight, diluting the resulting mixture with water, and heating the diluted mixture in a hydrolysing zone to remove formed isopropyl alcohol and di-isopropyl ether in the vapour phase, the quantity of added water being such as to leave sulphuric acid of a concentration in the range 40% to 47% by weight in the liquid phase, the steps of separating the removed isopropyl alcohol and di-isopropyl ether from each other, and recycling and absorbing the di-isopropyl ether in the sulphuric acid having a concentration in the range 65% to 80% by weight, the mol ratio of said recycled di-isopropyl ether to said last-named sulphuric acid being maintained in the range 1:10 to 1:20, whereby the di-isopropyl ether is converted into isopropyl sulphate which, upon hydrolysis, increases the yield of isopropyl alcohol.

3. In a process for producing isopropyl alcohol, which comprises absorbing propylene in the liquid phase at a temperature in the range 55–70° C. in sulphuric acid of a concentration in the range 72% to 75% by weight, diluting the resulting mixture with water, and heating the diluted mixture in a hydrolysing zone to remove formed isopropyl alcohol and di-isopropyl ether in the vapour phase, the quantity of added water being such as to leave sulphuric acid of a concentration in the range 40% to 47% by weight in the liquid phase, the steps of separating the removed isopropyl alcohol and di-isopropyl ether from each other, and recycling and absorbing the di-isopropyl ether in the sulphuric acid having a concentration in the range 72% to 75% by weight, the mol ratio of said recycled di-isopropyl ether to said last-named sulphuric acid being maintained in the range 1:10 to 1:20, whereby the di-isopropyl ether is converted into isopropyl sulphate which, upon hydrolysis, increases the yield of isopropyl alcohol.

4. In a process according to claim 1, the step of effecting simultaneously the absorption of propylene and of di-isopropyl ether in the sulphuric acid of a concentration in the range 72% to 75% by weight.

5. In a process according to claim 3, the step of effecting simultaneously the absorption of propylene and of di-isopropyl ether in the sulphuric acid of a concentration in the range 72% to 75% by weight.

6. In a process according to claim 1, the step of effecting the propylene absorption in the presence of mild steel.

JOHN HOWLETT.
WILLIAM LAURENCE WOOD.

(References on following page)

REFERENCES CITED

The following references are of record in the file of this patent:

UNITED STATES PATENTS

| Number | Name | Date |
|---|---|---|
| 1,733,720 | Carter | Oct. 29, 1929 |
| 1,885,585 | Brooks | Nov. 1, 1932 |
| 1,991,948 | Lacy | Feb. 19, 1935 |
| 2,109,462 | Burk et al. | Mar. 1, 1938 |
| 2,257,297 | Groombridge | Sept. 30, 1941 |
| 2,365,264 | Groombridge et al. | Dec. 19, 1944 |
| 2,368,484 | Mottern | Jan. 30, 1945 |
| 2,431,005 | Willauer et al. | Nov. 18, 1947 |
| 2,446,159 | Mottern et al. | July 27, 1948 |

FOREIGN PATENTS

| Number | Country | Date |
|---|---|---|
| 484,437 | Great Britain | May 5, 1938 |